United States Patent
Lehrer

[15] 3,654,869
[45] Apr. 11, 1972

[54] SHIP TRANSFER SYSTEM
[72] Inventor: Alexander Lehrer, Alexandria, Va.
[73] Assignee: Litten Systems, Inc., College Park, Md.
[22] Filed: July 27, 1970
[21] Appl. No.: 58,455

[52] U.S. Cl...................104/114, 212/72, 214/13, 254/172
[51] Int. Cl...................B65g 67/58
[58] Field of Search............214/12, 13, 14, 15 R; 212/72; 104/112, 114; 254/172

[56] References Cited

UNITED STATES PATENTS

| 709,915 | 9/1902 | Leonard | 212/72 X |
| 2,942,740 | 6/1960 | Pristach | 214/13 |
| 3,361,080 | 1/1968 | Bornetal | 104/114 |

FOREIGN PATENTS OR APPLICATIONS

| 1,162,645 | 8/1969 | Great Britain | 254/172 |
| 1,185,771 | 3/1970 | Great Britain | 254/172 |

*Primary Examiner*—Gerald M. Forlenza
*Assistant Examiner*—Frank E. Werner
*Attorney*—Alfred B. Levine and Alan Rose

[57] ABSTRACT

A less complex and more easily maintainable ship transfer system employing a pair of electrical motors, a double drum winch, and a direct mechanical gearing system interconnecting one of the motors to oppositely drive the drums, and the other motor to drive the drums in the same direction.

7 Claims, 4 Drawing Figures

SHIP TRANSFER SYSTEM

STATEMENT OF THE INVENTION

This invention relates to improvements in cargo handling and particularly in the transfer of loads between ships at sea; and seeks to maximize the operability and reliability of such systems, to reduce required operator and maintenance skill level, and to reduce their cost.

PRIOR ART

Currently used ships cargo transfer systems employ a highline, highline tensioner, and three winches for supporting a traversing trolley and transferring it between the two ships. Hydraulic controls or electronic controls, usually of an elaborate nature, are provided for regulating the electrohydraulic winches to maintain proper tension in the lines and to automatically pay out and draw in the lines with relative movement between the ships. The maintenance and repair of such systems requires highly skilled mechanics trained in hydraulics and electronics who are in short supply and it is therefore desired to provide a system that is more easily maintained and operated without the need for such highly skilled repairmen.

SUMMARY OF THE INVENTION

The present invention provides a system that is primarily mechanical in nature employing a pair of electrical drive motors interconnected by direct mechanical gearing to drive a double drum winch that received both inhaul and outhaul lines. The usual highline suspension is eliminated and the present invention instead jointly and differentially operates on both the inhaul and outhaul lines to both maintain proper tension and convey the trolley between the ships. The resulting system is less complex, occupies less space and weight, and requires considerably lower degree of skill for maintenance than prior systems.

PREFERRED EMBODIMENT

Figure 1:
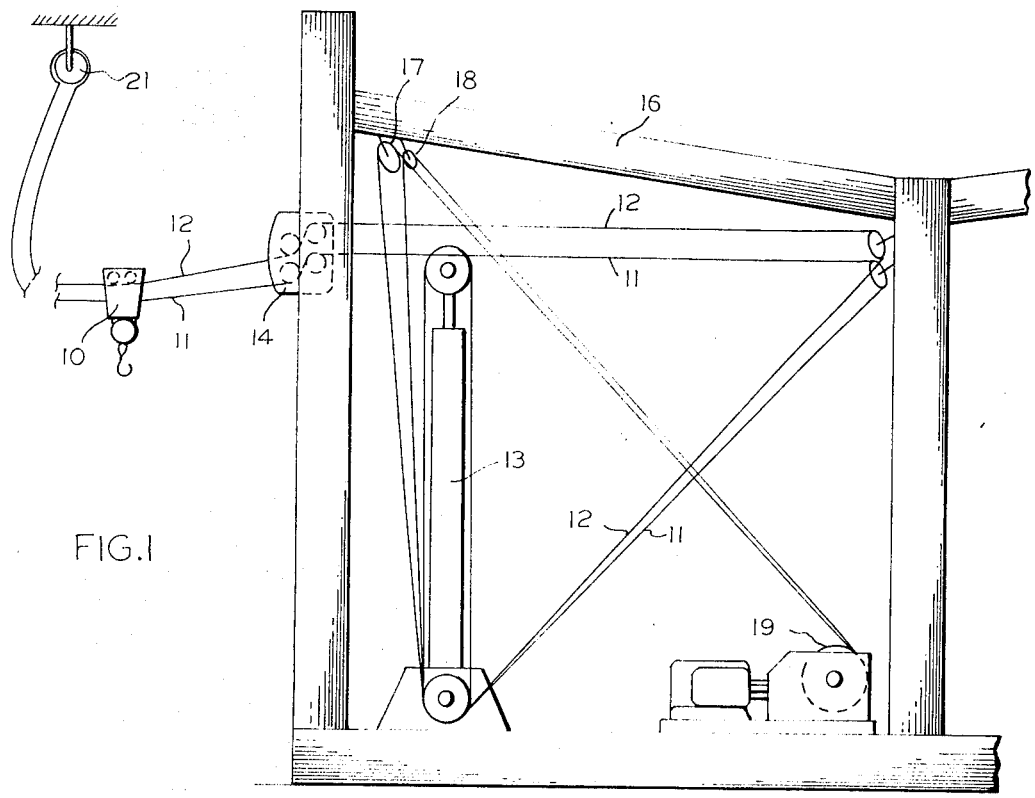
FIG. 1 is a schematic illustration of the preferred rig for regulating tension in the inhaul and outhaul lines and controlling trolley speed.

In the arrangement of FIG. 1, the trolley 10 is both supported and traversed by the inhaul cable 11 and outhaul cable 12 to travel between the sending or supply ship shown and the receiving ship (not shown).

Both of these lines or cables 11 and 12 are maintained under tension by passing about a single ram tensioner 13 of a conventional type, and this ram tensioner 13 pays out or draws in both lines together to accomodate small changes in separation between the ships resulting from ship's motion.

In contrast to conventional ram tensioners, ram 13 is provided with two sets of sheaves (not shown) instead of one, with each set handling a different one of the inhaul and outhaul lines as generally shown. Both lines 11 and 12 are initially led from the trolley 10 through a sliding block 14, and from the block, pass to the ram tensioner 13. After the ram 13, these lines 11 and 12 are passed over pulleys 17 and 18, respectively, supported by kingpost 16 on the supply or sending ship, and thence each line is directed to one of the double drums 19 or 20 of the single winch, best shown in FIGS. 2, 3, and 4.

At the receiving ship, the lines 11 and 12 pass about a suitable pulley and fitting, generally indicated as 21 in FIG. 1, to form a modified housefall rig.

The ram tensioner 13 is comparable in capacity to present highline ram tensioners, and the combined tension on the lines 11 and 12 supports the trolley 10 and its load. As the ships separate further or come closer together, the tensioner 13 pays out or draws in both lines together. This varies the distance between the trolley 10 and the sending or supply ship, but the trolley remains at constant distance from the receiving ship (not shown). For relatively small displacements between the ships, the ram tensioner 13 maintains proper tension in both lines 11 and 12. However, when the distance between the ships approaches the limit of travel of the ram, the double drums of the winch 19 and 20 are driven by motor 23 to pay out both lines together or to draw in both lines together and thereby recenter the ram tensioner. As will be described in greater detail, these drums are also differentially rotated as required to transport the trolley 10 between the sending and receiving ship.

Figure 3:
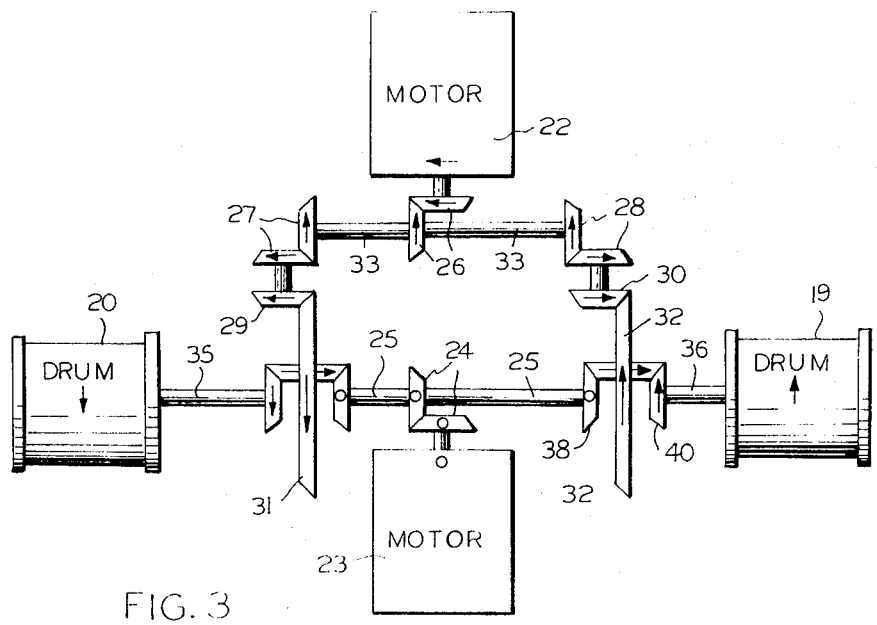
FIG. 3 schematically illustrates the functioning of the system for inhaul or outhaul of the trolley.
Figure 4:
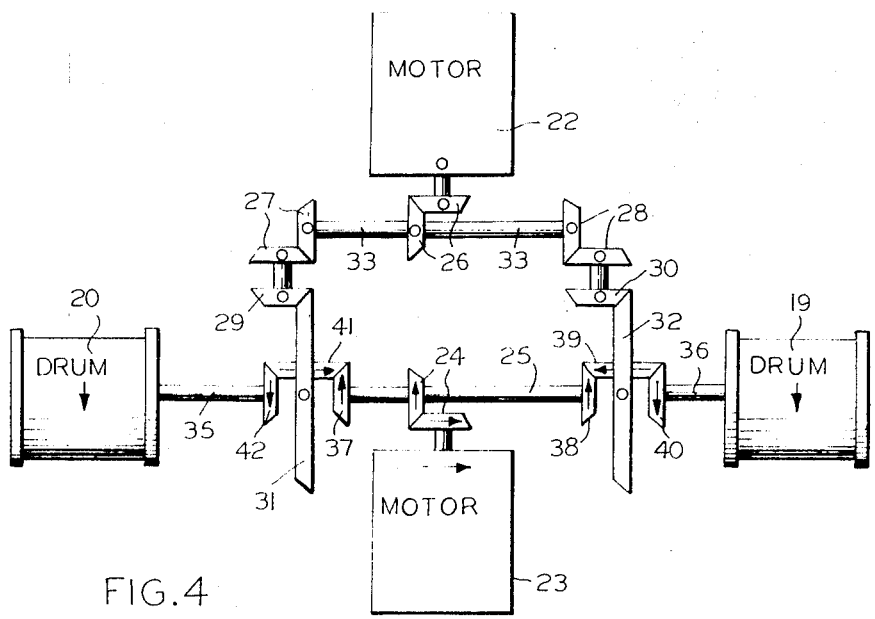
FIG. 4 schematically illustrates the functioning of the system in regulating tension in the inhaul and outhaul lines.

FIG. 4 best illustrates the functioning of the single winch having two drums 19 and 20 for recentering the ram and FIG. 3 illustrates differentially transporting the trolley 10 between the sending and receiving ship.

Figure 2:
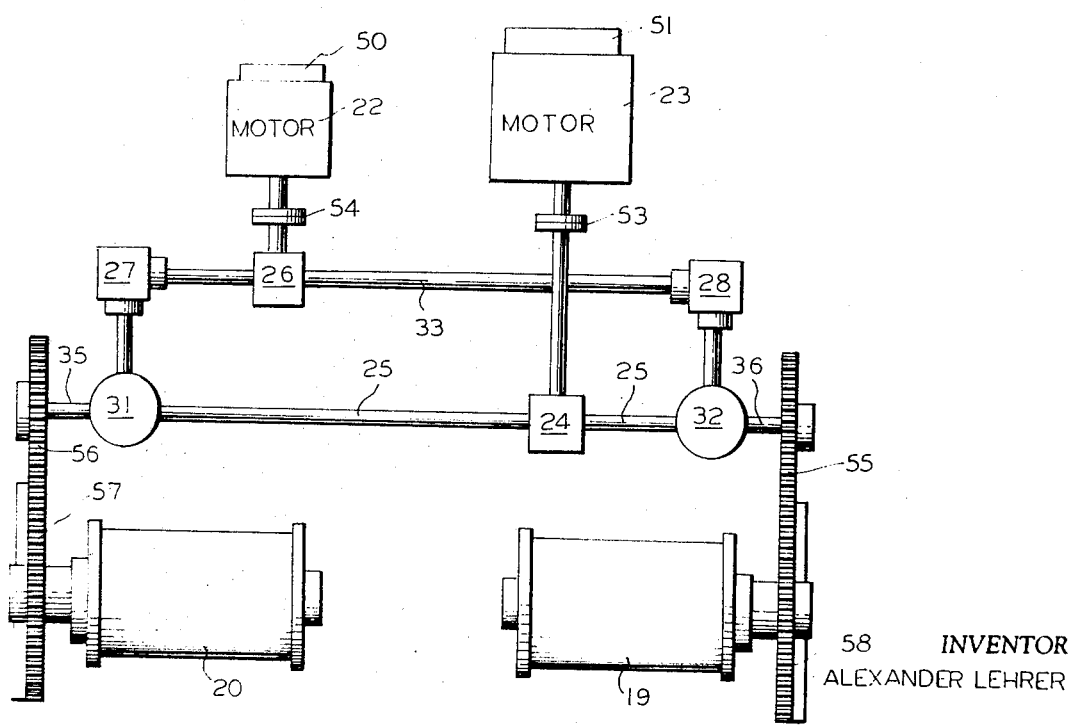
FIG. 2 illustrates the direct gearing interconnection between the pair of electric motors and the single double drum winch.

As shown in FIG. 2, the preferred drive system for the drums 19 and 20 includes an electric hauling motor 22, an electric centering motor 23 and direct gearing interconnecting both motors with the pair of drums 19 and 20 to provide joint rotation in the same direction, or differential operation in opposite directions, or both actions together, as might be needed should the distances between the ships be changing at the same time that the trolley 10 is passing between the ships.

Considering the hauling operation separately as shown in FIG. 3, the ram centering motor 23 is at this time stationary and locked by a brake 51 on the motor (FIG. 2). This immobilizes the bevel gears 24 and the shaft 25. Concurrently, the hauling motor 22 is rotating to drive the bevel gears 26 and rotate the shaft 33 thereby to drive the pairs of bevel gears 27 and 28 in the directions illustrated by the arrows. These gears 27 and 28, in turn, drive the bevel gears 29 and 30 thereby turning the large differential bevel gears 31 and 32. Since shaft 25 is locked against movement, these differential gears 31 and 32 oppositely rotate the shafts 35 and 36, thereby driving the drums 19 and 20 in the opposite directions, as shown, and drawing in or paying out the inhaul line 11 while oppositely operating on the outhaul line 12. This traverses the trolley 10 between the two ships as desired in a direction depending upon the direction of rotation of the hauling motor 22.

FIG. 4, alternatively illustrates the operation of the system when it is necessary for more line to be released or drawn in to accomodate major changes in the distance between the ships, recenter the ram 13, or for other purposes. Here the hauling motor 22 is locked by an electric brake 50 to immobilize the bevel gears 26, shaft 33, bevel gears 27, 28, 29 and 30, as well as large differential gears 31 and 32. On the other hand, the ram centering motor 23 is operated to drive bevel gear 24, shaft 25, gears 37, 38, 39, 40, 41 and 42, all as illustrated in FIG. 4, thereby rotating shafts 35 and 36 in the same direction as illustrated by the arrows. Thus both inhaul and outhaul cables 11 and 12 are commonly payed out or drawn in together as required to accomodate major changes in the spacing between the ships and to recenter the ram 13.

Due to the provision of the differential gearing in the power train interconnecting both drive motors 22 and 23 to the pair of drums 19 and 20, both operations involving hauling and centering can be carried out concurrently where need be to permit transfer of cargo between ships under conditions where the changing distance between ships is greater than can be accomodated by the extent of travel of the ram 13.

In the above described ram centering operation, the position of the trolley 10 is always maintained constant with respect to the receiving ship since the inhaul and outhaul lines 10 and 11 are payed out or drawn in together at the sending ship by the ram 13 and the ram centering motor 23. Where it is desired to maintain the trolley stationary at the sending or supply ship, a conventional trolley latching arrangement (not shown) may be employed to latch the trolley 10 to the frame in FIG. 1, or alternatively, a brake (not shown) is provided on the sliding block 14 (FIG. 1) to secure the inhaul line 11 to the sliding block 14. When the trolley is locked in this manner, the brake on the trolley hauling motor 22 is released and the hauling motor 22 is free to rotate. This equalizes the torques on shafts 35 and 36 and hence it equalizes the tension on the inhaul and outhaul lines, 11 and 12.

If the ships move apart while the trolley 10 is locked in this manner to the sending or supply ship the tension on the outhaul line 11 compresses the ram tensioner. This reduces tension in the inhaul line 11 and increases tension in the outhaul line 12. The winch then responds by paying out to the outhaul line, 12 and hauling in on the inhaul line 11 thus maintaining relatively equal tensions and accommodating the ship motion. Similarly the ram tensioner 13 and the winch maintain tension and accomodate motion as the ships move together. The human operator may also energize the ram centering motor 23 to center the position of the ram 13 as necessary.

In the preferred system, the electric hauling motor 22 and centering motor 23 are preferrably multi-speed motors having four different speeds. The highest speed is provided for rapid ship-to-ship transfer, and the lowest speed for inching or positioning the trolley 10 at the receiving ship. Two intermediate speeds are provided for transfer and centering as may be desired and for permitting other modes of operation. The control of the system is by human operator who is suitably provided with lever-type switches (not shown) to energize each motor and brake in the manner desired.

MODIFIED HOUSEFALL MODE

To operate this system as a modified housefall, the ram centering motor 23 is energized to pay out both lines until the ram tensioner is fully extended, at which point further payout removes all tension from the lines and slackens the lines as desired. To vertically raise and lower the trolley 10 and load, the ram centering motor 23 is energized to haul in or pay out both lines as desired. Independent or concurrent operation of the hauling motor 22 does not vary the degree of slack in the lines, or the vertical height of the load, but instead traverses the load at the same height between the sending and receiving ships. Thus in this mode of operation, the vertical height of the load and trolley is independently regulated by operation of the ram centering motor 23, and the traverse of the trolley 10 and load is independently regulated by the hauling motor. A conventional housefall fitting (not shown) may be used, instead of trolley 10, in the same mode of operation as described.

What is claimed is:

1. In a two line system for transferring cargo between ships at sea,
    a pair of drums,
    a pair of individually energizable reversible motors,
    direct gearing means for interconnecting one of said motors to differentially rotate said drums in opposite directions and connecting the other of said motors to rotate said drums in the same direction,
    said gearing means responsive to concurrent operation of both motors to drive said drum according to the algebraic sum of the movements of said motors,
    an inhaul and outhaul line for both supporting and traversing said cargo between said ships, said inhaul line being wound and unwound on one of said drums and said outhaul line being wound and unwound on the other drum.

2. In the system of claim 1, said gearing means including a pair of differential gears, each differential gear actuated by both motors to position a different drum according to the algebraic sum of the speeds of said motors.

3. In the system of claim 1, both of said motors being electrical motors.

4. In the system of claim 1, an automatically operating brake associated with each motor to prevent movement whenever the motor is deenergized.

5. In the system of claim 1, an independently actuatable brake for each of said drums.

6. In the system of claim 1, a rotatable sheave on the receiving ship for receiving and returning said inhaul and outhaul lines.

7. In the system of claim 1, means for maintaining preset total tension on both lines comprising a single ram tensioner for conjointly tensioning both lines.

* * * * *